Aug. 9, 1949.                R. B. JOHNSON                2,478,275
                        RECORD CARD SENSING DEVICE
Filed Jan. 13, 1948                                    3 Sheets-Sheet 1
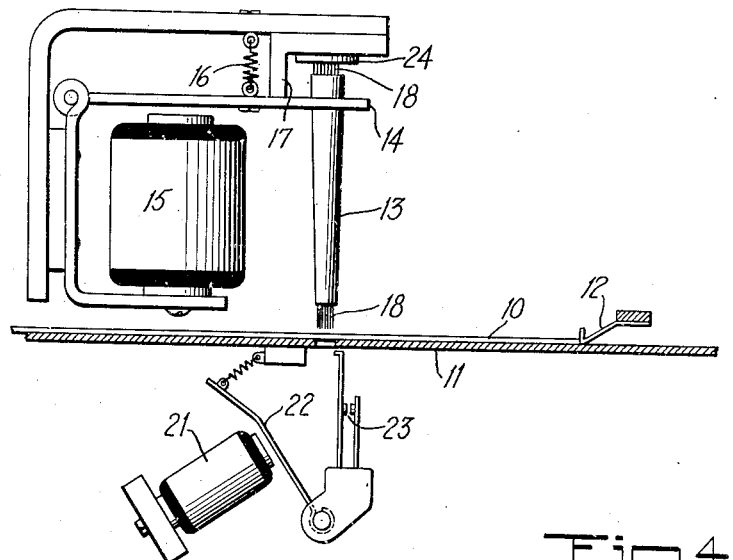
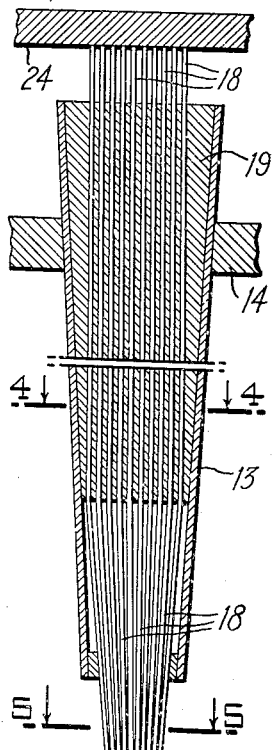
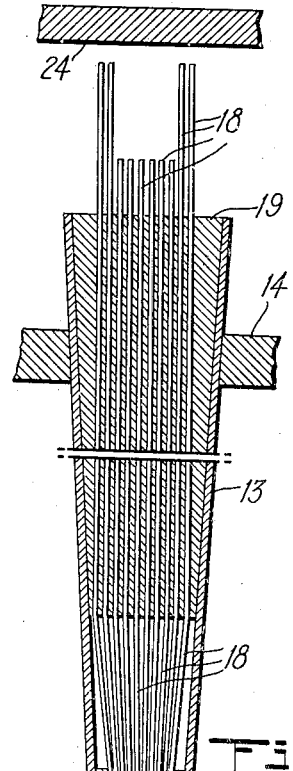
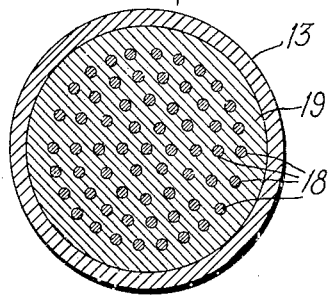
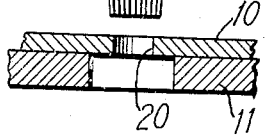
INVENTOR
REYNOLD B. JOHNSON
BY
William Lang
ATTORNEY Aug. 9, 1949.　　　　　R. B. JOHNSON　　　　　2,478,275
RECORD CARD SENSING DEVICE
Filed Jan. 13, 1948　　　　　　　　　　　　　3 Sheets-Sheet 2

INVENTOR
REYNOLD B. JOHNSON
BY William Lang
ATTORNEY

Aug. 9, 1949.  R. B. JOHNSON  2,478,275
RECORD CARD SENSING DEVICE
Filed Jan. 13, 1948  3 Sheets-Sheet 3
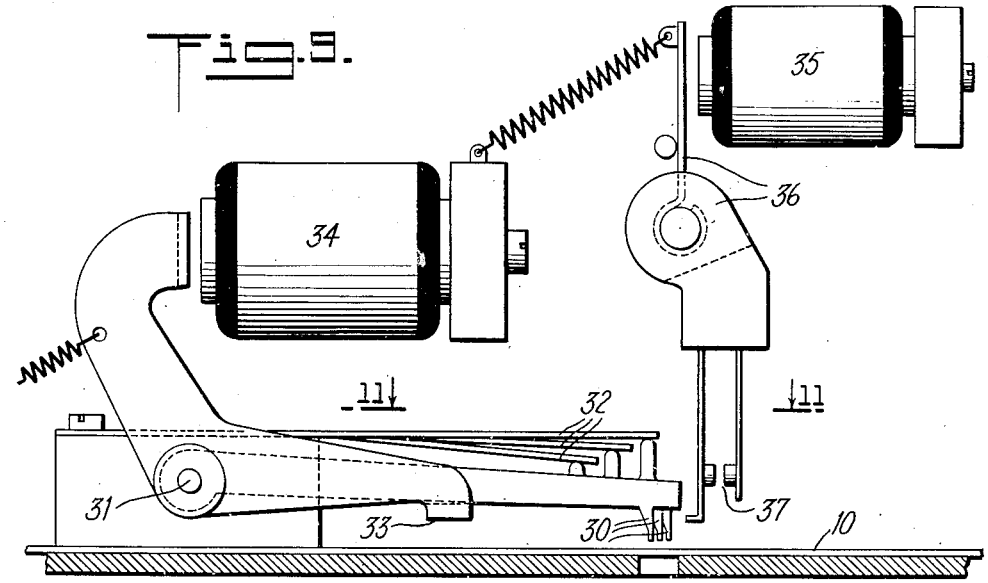
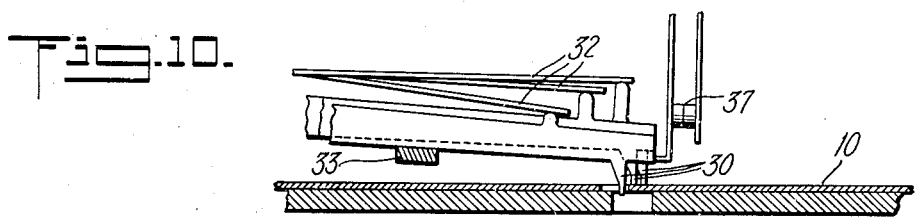
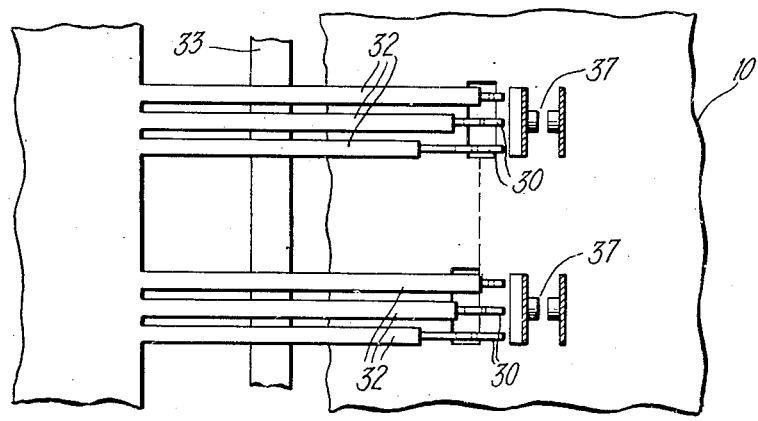
INVENTOR
REYNOLD B. JOHNSON
BY William Lang
ATTORNEY Patented Aug. 9, 1949

2,478,275

UNITED STATES PATENT OFFICE 2,478,275

RECORD CARD SENSING DEVICE

Reynold B. Johnson, Binghamton, N. Y., assignor to International Business Machines Corporation, New York, N. Y., a corporation of New York Application January 13, 1948, Serial No. 1,921

6 Claims. (Cl. 235—61.11)

This invention relates to devices for sensing perforation receiving positions in record cards or documents for the purpose of detecting the presence or absence of perforations in such positions.

The principal object of the invention is to provide an improved perforation sensing element which, when brought into sensing registration with a perforation receiving position of a record will respond to a perforation accurately registered in such position and also to a perforation that may be out of register by a greater extent that has heretofore been permissible in such devices.

In carrying out the object of the invention, there is provided a plurality of individual sensing elements associated with a perforation receiving position to be sensed and arranged so that, when such position is presented to the sensing elements, and a perforation therein is in correct registration or within a maximum allowable tolerance, one or more of the individual elements will respond to the perforation.

Prior record card sensing devices have generally employed a single sensing element in the form of a pin or finger which moved into engagement with a hole position in a card and, if a hole were present, the pin would pass therethrough to actuate some electrical or mechanical device. The allowable tolerance with such arrangement is very slight where the width or diameter of the pin is ½ of the hole width or diameter, since a displacement of the hole by a distance slightly more than ½ its radius or ¼ its width would obstruct entry of the pin into the hole, and for a larger diameter pin such tolerance would be correspondingly smaller.

In one form of the invention there is provided a plurality of pins arranged in what may be termed a bundle of closely spaced pins supported for individual movement in the direction of their longitudinal axes. The individual pin diameters are about ⅓ the diameter of the hole to be sensed, so that with a hole in exact registration, a plurality of pins will pass therethrough. With such arrangement the hole may be displaced an amount equal approximately to ⅔ its diameter with at least one of the pins remaining effective to pass through the hole. By providing a bundle of pins covering an area somewhat greater than the hole area, still greater tolerance is permitted. Thus where, for example, the pins are of a diameter equal to ⅓ the hole diameter and are bundled to a diameter equal to seven pin diameters, the hole may be out of registration about four pin diameters (more than its own diameter) and one or more pins will still be free to pass through the hole.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view showing one form of invention in which a bundle of sensing pins is employed to sense a registered hole position in a record card.

Fig. 2 is an enlarged sectional detail of one of the pin bundles to show its interior construction.

Fig. 3 is a view similar to Fig. 2 with the pins moved into sensing position.

Fig. 4 is a section through the pins taken on line 4—4 of Fig. 2.

Fig. 5 is a section through the pins taken on line 5—5 of Fig. 2.

Fig. 9 is a view of a third form of the invention showing a triple pin sensing arrangement.

Fig. 10 is an enlarged position view of parts in Fig. 9.

Fig. 11 is a detail taken on lines 11—11 of Fig. 10.

Figure 6:
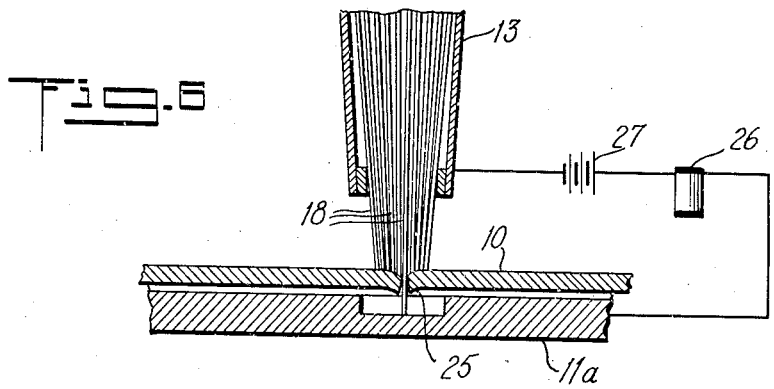
Fig. 6 is a detail showing the utilization of the pins for closing a circuit through a pierced hole.

Referring to Fig. 1, 10 represents a record card which is advanced along a bed plate 11 by a pusher 12 in a well known manner to present successive positions or areas in registration with the sensing device. Such device comprises a truncated conical tube 13 secured to armature 14 of a magnet 15 which is normally held in the position shown by a spring 16 and limit stop 17.

Within the tube 13 (see Figs. 2 and 5) are arranged a plurality of pins 18 retained in the spaced relationship shown in Fig. 4, i. e., arranged in a series of concentric circles and held in any suitable manner, as by moulding material 19 with the pins being slidable in the direction of their longitudinal axes and retained in position by frictional engagement with the sides of the openings through which they pass. At their lower ends the pins converge to form a compact circle of slightly spaced pins.

With a hole position in register with the vertical center line of tube 13, magnet 15 is energized through suitable means and armature 14 will lower tube 13 in a substantially straight line to the position of Fig. 3. If a hole 20 is present in the registered position, such pins 18 as are not in line with the hole will strike the surface of card 10 and be retarded thereby against continued movement with tube 13. The pins that are in line with the hole will pass therethrough retaining their initial relationship within the tube.

It is thus seen that with hole 20 (Fig. 5) having a diameter about three times the diameter of a pin 18, the hole may be out of registration with the center of the bundle of pins by more than its own diameter. Where, of course, such great tolerance is not anticipated the bundle may have its pins confined within a smaller area, for example, the outer circle of pins 18 may not be required.

While the tube is in its lowered position, a magnet 21 (Fig. 1) may be energized through some suitable means to rock armature lever 22 and contacts 23 carried thereby counter-clockwise. Where one or more pins 18 have passed through the hole, the left hand blade of contacts 23 will be intercepted and the contacts closed to complete a circuit for controlling well known current responsive devices.

Thereafter, magnet 15 is deenergized and spring 16 will return the armature 14 and tube 13 to its initial position and in so doing the pins 18 that have been shifted upwardly in the tube, due to contact with the card surface, will strike a fixed plate 24 and be returned to their initial positions within the tube.

In Fig. 6 the use of the bundle of pins 18 for sensing small pierced holes is illustrated. Here, 25 represents a hole made by piercing card 10 as with a needle, leaving a depending burr around a small opening. The tube may be connected to a current source as battery 27 and the bed plate 11a to a magnet 26 so that, when a pin 18 passes through the hole 25, an electrical circuit is completed through the hole to energize magnet 26.

Fig. 9 shows an arrangement in which, for each hole position to be sensed, there is provided a trio of pins 30 in the form of levers pivoted at 31 biased clockwise by blade springs 32 and normally held up by a bail 33 also pivoted at 31. The spacing of the pins 30 with respect to the hole position (in which rectangular holes may be made) is shown in Fig. 11.

Energization of a magnet 34 will rock bail 33 to release pins 30 for movement toward the card and those whose contacting tips find an opening will pass through as shown in Fig. 10. In this figure and in Fig. 11 it is readily seen that the hole may be out of register with the central pin in either a left or right direction a distance less than its width by the width of the tip of one of the pins. After the pins have been released for sensing action, a magnet 35 is energized to rock armature lever 36 to bring contacts 37 against the ends of the pins and any that have entered a hole will block the contacts as in Fig. 10 to cause closure thereof.

Figure 7:
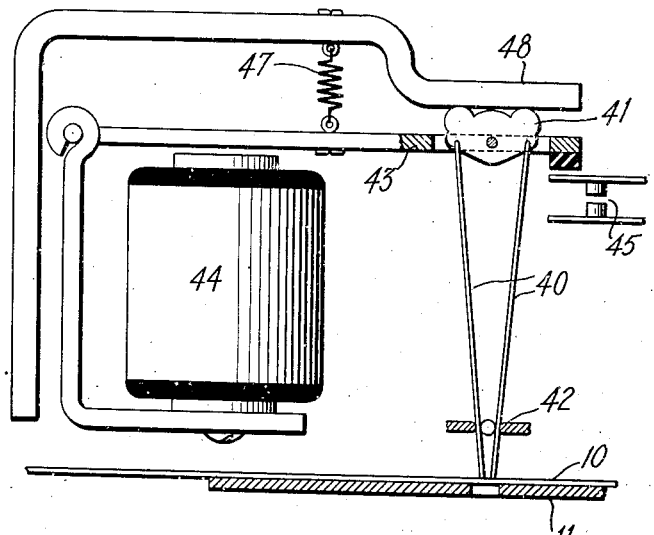
Fig. 7 is a view showing a second form of the invention in which a pair of pins is provided for sensing a hole position.
Figure 8:
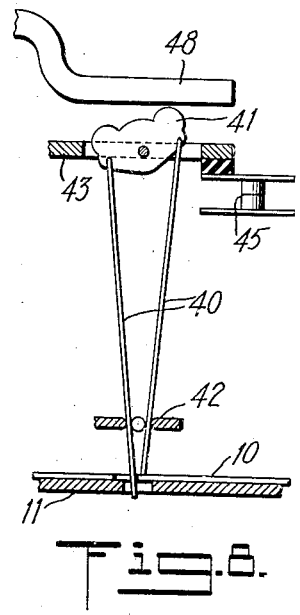
Fig. 8 is an enlarged detail of the pair of pins of Fig. 7 in sensing position to sense a hole that is out of registration.

Figs. 7 and 8 show a third form of pin arrangement wherein a pair of pins 40 is provided and swiveled in a plate 41 at their upper ends. Their lower ends are guided by an opening through a fixed plate 42. The plate 41 is pivotally mounted on armature 43 of magnet 44 so that, when the magnet is energized, plate 41 will be moved downwardly and will push the pins 40 in the same direction. If there is no hole in card 10, the pins will be intercepted and will prevent armature 43 from moving sufficiently to close contacts 45. If both pins pass through the hole, the armature will descend far enough to close the contacts. If the hole is out of register so that only one pin enters, the action will be as illustrated in Fig. 8 where the retarded pin causes rocking of plate 41 to enable the armature to move into contact position. Upon the return of the armature by its spring 47 the plate 41 will encounter fixed stop member 48 and be restored thereby to the position of Fig. 7.

While there have been shown and described and pointed out the foundamental novel features of the invention as applied to several modifications, it will be understood that various omissions and substitutions and changes in the forms and details of the devices illustrated and in their operations may be made by those skilled in the art without departing from the spirit of the invention. It is the intention, therefore, to be limited only as indicated by the scope of the following claims.

What is claimed is:

1. A sensing device for sensing a perforation receiving position of a record, which position constitutes a delimited area in which a perforation may be made, comprising a plurality of pins, means for moving the pins in the direction of their length into engagement with said area to separately contact different portions thereof by abutment of their ends therewith, said pins being separately movable whereby the ends of such pins whose related portions are perforated will pass through the record and the ends of such pins whose related portions are imperforate will abut and have their movement intercepted by, the record, a machine control device, and means controlled by any pin upon movement through the perforation in the said area for causing actuation of said control device.

2. A sensing device for sensing a perforation receiving position of a record, which position constitutes a delimited area in which a perforation may be made comprising a plurality of pins, a carrier therefor, means for moving the carrier a predetermined extent toward the record, said pins being frictionally supported by the carrier for movement therewith, engagement of any pin with an imperforate portion of said area causing interruption of its movement with the carrier, whereby the pin will be displaced on the carrier against its frictional support and any pin whose related portion of the area is perforated will pass through said portion, a machine control device, and means controlled by any pin upon movement through the perforation in said area for causing actuation of said control device.

3. The invention set forth in claim 2 in which the carrier is reciprocable to move toward the record and then back again, and means is provided to engage and restore all displaced pins during the return movement of the carrier.

4. A sensing device for sensing a perforation receiving position of a record, which position constitutes a delimited area in which a perforation may be made, comprising a plurality of pins, means for concurrently moving the pins in the direction of their length into engagement with said area to separately contact different portions thereof by abutment of their ends therewith, said pins being separately movable whereby the ends of such pins whose related portions are perforated will pass through the record and the ends of such pins whose related portions are imperforate will abut and have their movement intercepted by the record, and means for sensing the pins after their movement to and through the record to ascertain whether any have passed therethrough.

5. A sensing device for sensing a perforation receiving position of a record, which position constitutes a delimited area in which a perforation may be made, comprising a plurality of pins, a carrier therefor, means for moving the carrier a predetermined extent toward the record, said pins being displaceably supported by the carrier for movement in the direction of their longitudinal axes, abutment of the end of any pin with an imperforate portion of said area causing interruption of its movement with the carrier and displacement thereon, and any pin whose related portion of the area is perforated will pass through said portion, a machine control device, and means controlled by any pin upon movement through the perforation in said area for causing actuation of said control device.

6. The invention set forth in claim 4 in which springs are provided to normally bias the pins toward the record, means for normally holding the pins away from the record, and means for releasing said holding means whereby said springs will urge the pins against the said area.

REYNOLD B. JOHNSON.

REFERENCES CITED

The following references are of record in the file of this patent:

UNITED STATES PATENTS

| Number | Name | Date |
| --- | --- | --- |
| 2,335,928 | Ford | Dec. 7, 1943 |